(12) United States Patent
Wilson, Jr. et al.

(10) Patent No.: US 7,861,510 B1
(45) Date of Patent: Jan. 4, 2011

(54) CERAMIC REGENERATOR FOR A GAS TURBINE ENGINE

(75) Inventors: Jack W. Wilson, Jr., Palm Beach Gardens, FL (US); John E. Ryznic, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 180 days.

(21) Appl. No.: 12/276,322

(22) Filed: Nov. 22, 2008

(51) Int. Cl.
*F02C 7/00* (2006.01)
*F02G 1/00* (2006.01)

(52) U.S. Cl. ............ 60/39.511; 165/158; 60/266
(58) Field of Classification Search .......... 60/266, 60/267, 39.511; 165/158
See application file for complete search history.

(56) References Cited

U.S. PATENT DOCUMENTS

| | | | |
|---|---|---|---|
| 3,222,864 A | 12/1965 | Dyste et al. | |
| 3,267,673 A | 8/1966 | Hemsworth et al. | |
| 3,320,749 A | 5/1967 | Castle et al. | |
| 3,507,115 A * | 4/1970 | Wisoka | 60/39.511 |
| 4,180,973 A * | 1/1980 | Forster et al. | 60/39.511 |
| 5,105,617 A * | 4/1992 | Malohn | 60/39.511 |
| 5,238,057 A | 8/1993 | Schelter et al. | |
| 5,396,760 A * | 3/1995 | Hines | 60/39.511 |
| 5,623,988 A | 4/1997 | Holowczak et al. | |
| 6,598,400 B2 * | 7/2003 | Nash et al. | 60/772 |
| 6,712,131 B1 | 3/2004 | Brinkman et al. | |
| 6,832,470 B2 * | 12/2004 | Dewis | 60/39.511 |
| 6,966,173 B2 * | 11/2005 | Dewis | 60/39.511 |
| 7,240,724 B2 * | 7/2007 | Graham et al. | 165/158 |
| 2008/0173006 A1 * | 7/2008 | Kataoka et al. | 60/39.511 |

* cited by examiner

*Primary Examiner*—William H Rodriguez
(74) *Attorney, Agent, or Firm*—John Ryznic

(57) ABSTRACT

A high temperature heat exchanger for use with a small gas turbine engine to produce a combined cycle power plant, where the heat exchanger includes ceramic heat exchange tubes of SiC that are tightly fitted to the heat exchanger so that no welds or brazing is used and prevent any thermal stresses between the tubes and the heat exchanger end plates or baffle plates. The heat exchanger includes an inner casing and an outer casing with the heat exchange tubes extending through the heat exchanger between the two casings, and the gas turbine engine operating in the space within the inner casing. The tubes are tightly fitted in holes within the end plates and baffle plates, and a molybdenum disulfide coating is used to form a seal.

17 Claims, 3 Drawing Sheets

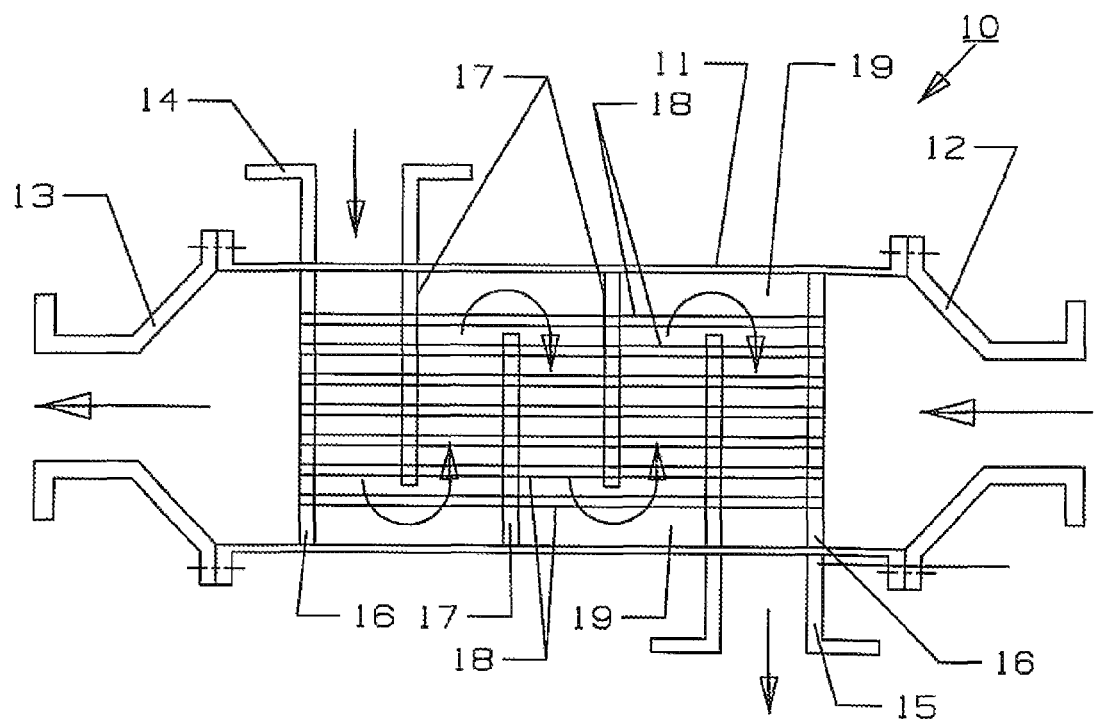
Fig 1
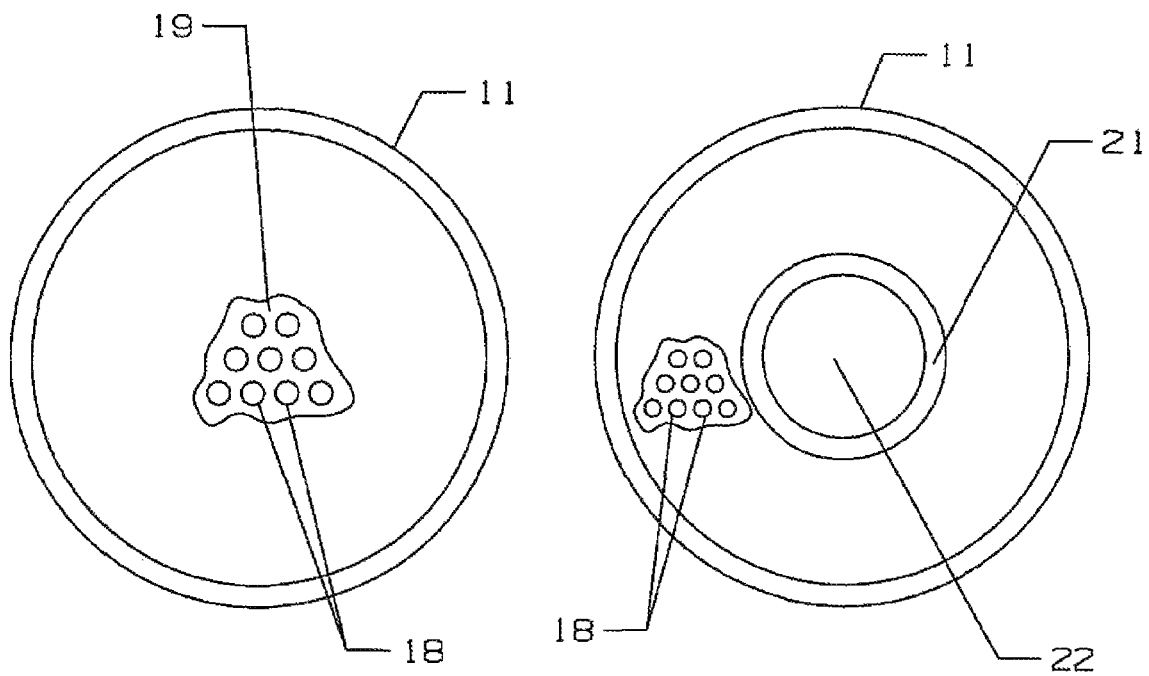
Fig 2
Fig 3

CERAMIC REGENERATOR FOR A GAS TURBINE ENGINE

FEDERAL RESEARCH STATEMENT

None.

CROSS-REFERENCE TO RELATED APPLICATIONS

None.

BACKGROUND OF THE INVENTION

1. Field of the Invention

The present invention relates generally to a heat exchanger, and more specifically to a ceramic heat exchanger for use with a high temperature fluid.

2. Description of the Related Art Including Information Disclosed Under 37 CFR 1.97 and 1.98

A gas turbine engine is one of the most efficient engines for converting the combustion of a fuel into mechanical work. Small gas turbine engines have been proposed for use in vehicles because of their efficiency. However, without the use of a heat exchanger (also referred to as a regenerator or a recuperator when used in a gas turbine engine) to form a combined cycle power plant, the small gas turbine engine is less efficient than a diesel engine. The diesel engine, although a high efficient engine, is also a high polluting engine. In order to replace the diesel engine with a small gas turbine engine, a workable regenerator is required to raise the efficiency to that above the diesel engine.

Heat exchangers (regenerators) are well known in the art for use with gas turbine engines in order to produce a combined cycle power plant. In a combined cycle power plant, the exhaust heat from the turbine outlet is used to preheat the air fed into the compressor in order to increase the efficiency of the engine. in some cases, the compressor outlet air is heated with the regenerator prior to entering the combustor. Prior art heat exchangers are made of materials that have high heat transfer coefficients in order to produce high heat transfer amounts. Copper is one well known material for use in heat exchangers. However, copper has a relatively low melting temperature when compared to the outlet temperatures of a gas turbine engine.

One reason why heat exchangers have not become practable for use with smaller gas turbine engines is because of the high thermal stresses developed from combining the high temperature turbine exhaust gas with the low temperature inlet air for the compressor in the heat exchanger. These high thermal stresses that develop produce cracks in the tubes where the heat exchanger has been brazed or welded in its construction. The tubes that are used are typically brazed or welded to the end plates and the baffles. The high temperature difference between the hot fluid and the cooler fluid will produce thermal stresses that lead to cracks between the brazed or welded tube and the baffle or end plate. The cracks will produce unacceptable leakage and make the heat exchanger useless.

Another reason why heat exchangers have not become practable for use in smaller gas turbine engines is that they tend to be much larger than the engine in order to provide for the required increase in efficiency of the combined cycle power plant. Also, the passages formed within the heat exchanger can be complex and thus very costly to manufacture. The surface area for the heat transfer between the hot fluid and the cold fluid must be as large as possible in order to improve the efficiency of the heat exchanger and therefore gas turbine engine. Providing for long passages through the heat exchanger increases the efficiency. In some cases, the cost of the heat exchanger would be much more than the cost of the small gas turbine engine.

BRIEF SUMMARY OF THE INVENTION

It is an object of the present invention to provide for a low cost heat exchanger that can be used under relatively high temperature environments such as in a gas turbine engine.

It is another object of the present invention to provide for a heat exchanger with tubes that are free to slide with respect to the end plates in order to eliminate welds or brazing and thus prevent cracks due to thermal stress loads.

It is another object of the present invention to provide for a heat exchanger that requires no welds or brazes so that an infinite LCF life can be obtained.

It is another object of the present invention to provide for a heat exchanger that can be used with a small gas turbine engine so that the engine efficiency will be greater than the efficiency of a diesel engine.

It is another object of the present invention to provide for a heat exchanger that can be used with a twin spool gas turbine engine.

The present invention is a heat exchanger that can be used as a regenerator or a recuperator in a gas turbine engine in order to improve the efficiency of the engine. The heat exchanger is formed with a plurality of high temperature resistant tubes that extend through the heat exchanger body that is enclosed on both ends by end plates, where the cooler fluid flows through the tubes. An alternating series of baffle plates or a spiral shaped baffle plate forms a serpentine or spiral passage over the tubes for the hot fluid to flow through the heat exchanger. The tubes are tightly fitted to holes formed in the end plates and the baffle plates in which not welds or brazing is used to secure the tubes to the holes. The tubes are also made from a high temperature resistant ceramic material such as Hexoloy (SiC) in order that the heat exchanger can be used in a relatively high temperature fluid such as that needed in a regenerator for a gas turbine engine.

In one embodiment, the cold fluid tubes pass from one end to the opposite end and then back to the starting end for the loop through the heat exchanger, while the hot fluid passage extends from the U-turn end to the entrance/exit end of the cold fluid through a serpentine path or a spiral path. In this design, the compressor outlet air can be passed through the heat exchanger tubes and become preheated by the turbine exhaust gas prior to entering the combustor to be burned with a fuel and produce the hot gas flow that is then passed through the turbine of the engine.

BRIEF DESCRIPTION OF THE SEVERAL VIEWS OF THE DRAWINGS

FIG. 1 shows a cross section view of a first embodiment of the heat exchanger of the present invention.

FIG. 2 shows a cross section front view of a first embodiment of the heat exchanger of the present invention.

FIG. 3 shows a cross section front view of a second embodiment of the heat exchanger of the present invention.

DETAILED DESCRIPTION OF THE INVENTION

Figure 4:
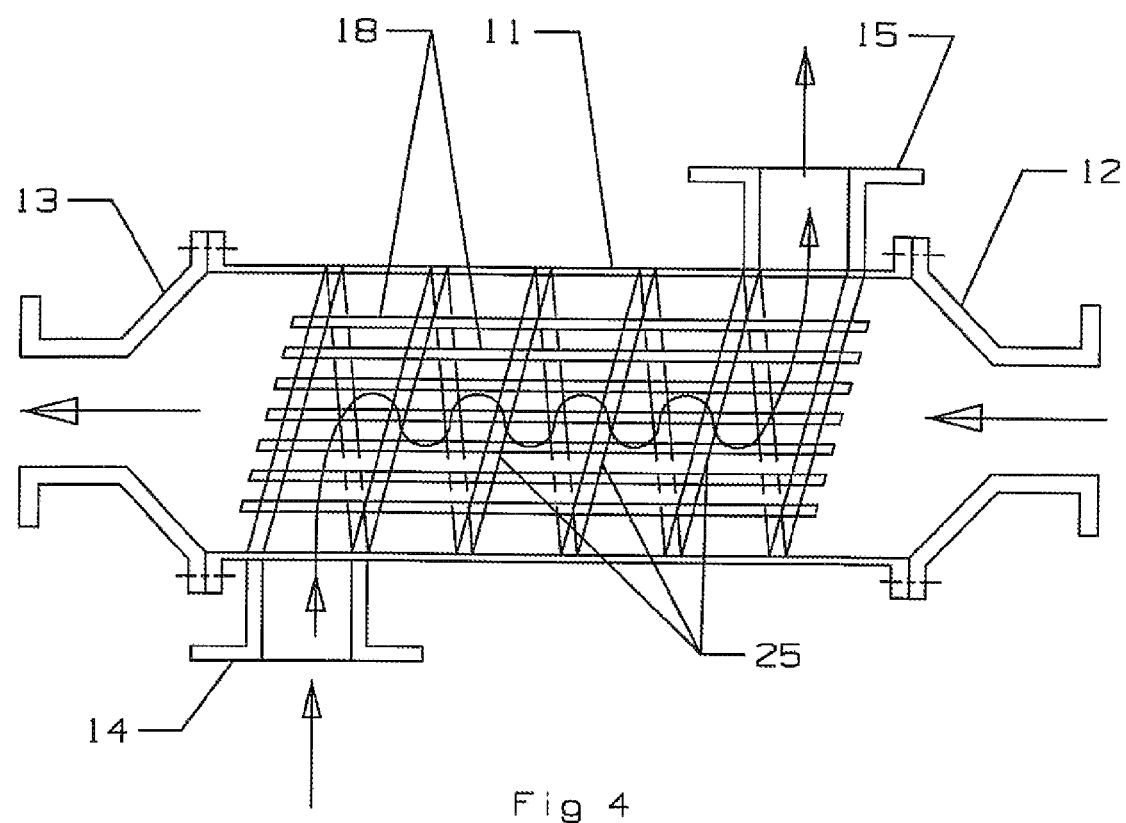
FIG. 4 shows a fourth embodiment of the heat exchanger of the present invention.

The present invention is a heat exchanger that can be used as a regenerator with a gas turbine engine. The heat exchanger includes tubes for one of the two fluids in which the tubes are not welded or brazed to the structure to eliminate cracking form thermal stresses due to the passage of a relatively high temperature fluid. Also, in order to allow for the heat exchanger to be used in a relatively high temperature fluid, such as that in a regenerator in a gas turbine engine, the tubes are made from a high temperature resistant ceramic material with a high thermal conductivity.

FIG. 1 shows a first embodiment of the heat exchanger of the present invention. The heat exchanger includes an inlet end 12 and an outlet end 13 for a cold fluid (in relative terms), and an inlet tube 14 and an outlet tube 15 for a hot fluid. The cold fluid passes through a plurality of tubes 18 that extend from the inlet end 12 to the outlet end 13 and form closed passages. An inlet end plate 16 and an outlet end plate 16 close off the heat exchanger hot fluid passage in which the tubes open into. Cold fluid that enters the inlet section 12 then passes through the tubes 18 and out into the outlet section 13 of the heat exchanger.

The hot passage is formed between the end plates 16 by an alternating series of baffle plates 17 that form a serpentine flow passage through the hot fluid passage between in inlet tube 14 and the outlet tube 15. The hot fluid passes over and around the tubes 18 to transfer heat from the hot fluid into the cold fluid through the tubes 18.

In order to use the heat exchanger in a relatively high temperature fluid, the tubes are made from a high temperature resistant material that has a high thermal conductivity. In the present invention, the tubes 18 are made from a SiC material such as Hexoloy. The SiC tubes 18 have an outside diameter of 0.500 inches and a wall thickness of 0.035 inches. Also, so that a thermal stress does not form between the tubes and the end plates or baffle plates, the tubes are not welded or brazed to the holes in the plates in which the tubes pass through. A tight fit between the tube and the hole in the plate is produced of between 0.0005 inches to 0.0025 inches. The tubes at the openings on the end plates are coated with a (Molybdenum) Moly Disulfide coating to form a seal. The holes in the baffle plates form a loose fit with the tubes of between 0.0005 inches and 0.0025 inches and also include a Moly Disulfide coating to form a seal between the hole and the tube.

The inlet and outlet pipes 14 and 15 for the hot fluid are threaded onto the outer casing 11 of the heat exchanger and a sealant is used to form a seal. In this embodiment, the sealant is Silkolene 762 which is a high temperature sealant used in aero engines having a service temperature of around 1,470 degrees F.

The outer casing 11 of the heat exchanger, the end plates 16, the baffles plates 17, and the inlet and outlet sections 12 and 13 are all made from Titanium 21S for an aero engine, and from Nickel Inco 625 for an Industrial gas turbine engine. Instead of the tubes being made from SiC, other parts of the heat exchanger could also be made from this material such as the baffle plates and the end plates. In this embodiment, the parts that contact the Hexoloy tubes would be made form the same material.

One of the features of the heat exchanger of the present invention that allow it to be used with a relatively high temperature fluid is that the tubes can slide within the holes so that thermal stresses do not develop from the thermal fight between the hot fluid and the cold fluid. These thermal stresses are what leads to the cracks that makes the prior art heat exchangers useless in a gas turbine engine. Another feature is the use of the SiC tubes that have a high temperature use and a high thermal conductivity compared to other high temperature resistant materials such as steel. The Hexoloy material has a five times better thermal conductivity than other high thermal conductivity materials so a higher efficient heat exchanger can be formed. Also, because not welding or brazing of the tubes is required, the heat exchanger can be more easily assembled than the prior art heat exchangers.

FIG. 2 shows one arrangement for the heat exchanger of FIG. 1 where the entire inside of the outer casing is used for the passage of the fluids. FIG. 3 shows another embodiment which is used with the small gas turbine engine as a regenerator. This heat exchanger includes an outer casing 11 and an inner casing 21 that forms a central opening 22 in which the gas turbine engine is mounted. The tubes 18 pass through the space formed between the inner and outer casings.

FIG. 4 shows another embodiment of the heat exchanger in which the hot fluid passage is formed in a spiral path instead of a serpentine flow path in the FIG. 1 embodiment. The spiral flow path in the FIG. 4 embodiment offers a reduced flow resistance for the hot fluid passage. The hot fluid passage is formed from a helical plate 25 that forms the spiral passage and forms the two end plates and the plurality of baffle plates in-between the end plates. The holes are formed in the baffle plates 25 in order for the tubes 18 to pass through and open into the inlet section 12 and the outlet section 13. The inlet to the spiral baffle plate is connected to the inlet tube 14 and the outlet to the spiral baffle plate 25 is connected to the outlet tube 15. The spiral baffle plate 25 forms a continuous and closed fluid path from the inlet tube 14 to the outlet tube 15 for the hot fluid to flow over and around the cold fluid tubes 18. The materials used in the FIG. 4 embodiment are made of the same materials used in the FIG. 1 embodiment. Also, the tubes 18 are tightly fitted on the outer plates of the spiral baffle plate and loosely fitted in the plates in-between the end plates for the same reason as described in the FIG. 1 embodiment. Also, the Moly Disulfide coating is used to form a sealant with the holes on the baffle and end plates. The spiral shaped baffle tube is considered to be a plurality of baffle tubes with the heat exchange tubes passing through the baffle tubes between the end plates.

In both heat exchangers of the FIG. 1 and FIG. 4 embodiments, the two fluids are counter flowing in order to increase the efficiency of the heat exchanger.

Figure 5:
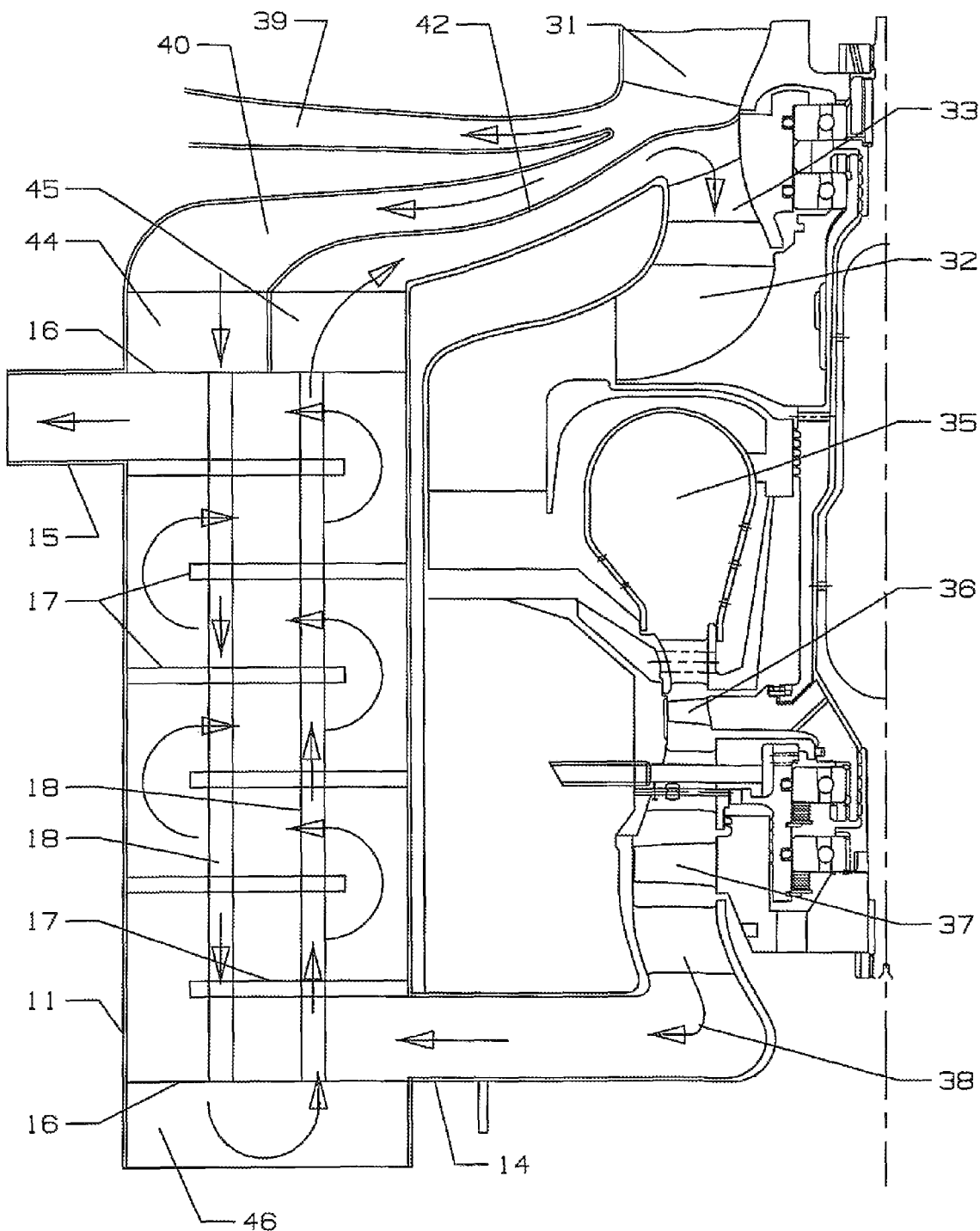
FIG. 5 cross section view of the heat exchanger of the present invention used in a gas turbine engine

FIG. 5 shows the heat exchanger of the FIG. 1 embodiment used as a regenerator in a small gas turbine engine. The heat exchanger is of the type shown in FIG. 3 in which a central opening is formed in the heat exchanger in which the gas turbine engine is placed. The gas turbine engine is a twin spool engine, but could be a single spool engine. The engine in FIG. 5 includes a low pressure compressor or bypass fan 31, a diffuser 33, a high pressure centrifugal compressor 32, a combustor 35, a high pressure turbine blade 36, a low pressure turbine blade 37, and a turbine exhaust passage 38, among other parts of the engine. The air compressed by the bypass fan 31 flows into a bypass channel 39 to be used for propelling the aircraft will some of the air passing into the cold fluid inlet passage 40 of the heat exchanger or regenerator. The regenerator includes on the one end an annular inlet section 44 for the cold fluid and an annular outlet section 45. The annular outlet section 45 is connected by an annular passage 42 to the high, pressure compressor inlet. The regenerator includes a turn-around passage 46 on the opposite end for the cold fluid.

Because the regenerator of FIG. 5 is an annular configuration with the tubes located between the inner casing 21 and the outer casing 11, a set of tubes 18 that carry the cold fluid into the turn-around passage 46 must be equal to the set of tubes 18 that carry the cold fluid from the turn-around passage 46. The annular inlet and the annular outlet passages 44 and 45 are separated by an annular wall to divide these two passages so that the cold fluid does not mix. The number of tubes that flow from the annular inlet passage 44 should equal the number of tubes that flow into the annular outlet passage 45 to have the same flow velocity.

The regenerator includes tubes 18 passing from the inlet and outlet sections 44 and 45 and into the turn-around section 46 so that the cold fluid from the fan outlet passage 40 and the annular inlet section 44 will flow through one set of tubes and into the turn-around section 46, and then flow back through the heat exchanger section and into the annular outlet section 45. The hot fluid passage is formed between the end plates 16 with the baffle plates 17 forming a serpentine flow passage through the heat exchanger. The gas turbine engine exhaust from the turbine flows out from the turbine exhaust passage 38 and into the hot fluid inlet tube 14, through the serpentine flow passage and out the hot fluid outlet tube 15. In this embodiment, the hot fluid inlet tube and outlet tube can both be formed as annular channels around the heat exchanger casings.

The heat exchanger in the FIG. 4 embodiment with the spiral flow path for the hot fluid could also be used as the regenerator with the gas turbine engine in FIG. 5 by modifying the cold fluid inlet and outlet with the annular passages that separate to two passages for the cold fluid.

In the embodiment of FIG. 5, the heat exchanger is used in a twin spool gas turbine engine to form a combined cycle engine. in this embodiment, the compressed air exiting the fan or low pressure compressor flows through the heat exchanger and then into the inlet of the second or high pressure compressor. In other embodiments, the compressed air exiting from the second or high pressure compressor can be directed through the heat exchanger and then directly into the combustor. Thus, the heat exchanger is operated between the high pressure compressor and the combustor. In a single spool engine, the heat exchanger will be located between the compressor and the combustor.

We claim the following:

1. A combined cycle power plant comprising:
a small gas turbine engine;
a high temperature heat exchanger;
the heat exchanger having an outer casing and an inner casing;
a plurality of ceramic heat exchange tubes extending through the heat exchanger between the outer casing and the inner casing;
the plurality of ceramic heat exchanger tubes forming a low temperature flow path through the heat exchanger;
the ceramic heat exchange tubes being loosely fitted to the heat exchanger such that thermal stress does not form between the tubes and the heat exchanger due to the flow of the high temperature fluid through the heat exchanger;
the small gas turbine engine secured within the inner casing of the heat exchanger; and
a molybdenum disulfide coating is formed on contact surfaces between the heat exchanger tubes and end plates of the heat exchanger.

2. The combined cycle power plant of claim 1, and further comprising:
the ceramic heat exchanger tubes are SiC tubes.

3. The combined cycle power plant of claim 1, and further comprising:
the heat exchanger tubes are secured to end plates without welds or brazing to produce an infinite LCF life.

4. The combined cycle power plant of claim 1, and further comprising:
the heat exchange tubes have an outer diameter of around 0.5 inches and a wall thickness of around 0.035 inches.

5. The combined cycle power plant of claim 1, and further comprising:
the heat exchange tubes form a tight fit with holes in end plates of around 0.0002 inches leakage.

6. The combined cycle power plant of claim 1, and further comprising:
a molybdenum disulfide coating is formed on contact surfaces between the tubes and the baffle plates.

7. The combined cycle power plant of claim 1, and further comprising:
the heat exchanger tubes are secured to end plates without welds or brazing to produce an infinite LCF life.

8. The combined cycle power plant of claim 1, and further comprising:
the heat exchange tubes have an outer diameter of around 0.5 inches and a wall thickness of around 0.035 inches.

9. The combined cycle power plant of claim 1, and further comprising:
the heat exchange tubes form a tight fit with holes in end plates of around 0.0002 inches leakage.

10. A combined cycle power plant comprising:
a small gas turbine engine;
a high temperature heat exchanger;
the heat exchanger having an outer casing and an inner casing;
A plurality of ceramic heat exchange tubes extending through the heat exchanger between the outer casing and the inner casing;
the plurality of ceramic heat exchanger tubes forming a low temperature flow path through the heat exchanger;
the ceramic heat exchange tubes being loosely fitted to the heat exchanger such that thermal stress does not form between the tubes and the heat exchanger due to the flow of the high temperature fluid through the heat exchanger;
the small gas turbine engine secured within the inner casing of the heat exchanger;
a plurality of baffle plates positioned between two end plates to form a serpentine flow path through the heat exchanger for the high temperature fluid; and,
the heat exchange tubes pass through the baffle plates in a loosely fitted relation.

11. The combined cycle power plant of claim 10, and further comprising:
a molybdenum disulfide coating is formed on contact surfaces between the tubes and the baffle plates.

12. The combined cycle power plant of claim 10, and further comprising:
the heat exchanger casing, inlet end and outlet end are formed of titanium 21S or Nickel Inco 625.

13. The combined cycle power plant of claim 10, and further comprising:
the heat exchanger is connected to the gas turbine engine such that the exhaust gas from the engine flows around the heat exchange tubes and the compressed air from the compressor flows through the heat exchange tubes.

14. A combined cycle power plant comprising:
a small gas turbine engine;
a high temperature heat exchanger;
the heat exchanger having an outer casing and an inner casing;

a plurality of ceramic heat exchange tubes extending through the heat exchanger between the outer casing and the inner casing;

the plurality of ceramic heat exchanger tubes forming a low temperature flow path through the heat exchanger;

the ceramic heat exchange tubes being loosely fitted to the heat exchanger such that thermal stress does not form between the tubes and the heat exchanger due to the flow of the high temperature fluid through the heat exchanger;

the small gas turbine engine secured within the inner casing of the heat exchanger;

a spiral shaped baffle plate positioned between two end plates to form a spiral flow path through the heat exchanger for the high temperature fluid; and, the heat exchange tubes pass through the spiral shaped baffle plate in a loosely fitted relation.

15. The combined cycle power plant of claim 14, and further comprising:

a molybdenum disulfide coating is formed on contact surfaces between the tubes and the baffle plates.

16. The combined cycle power plant of claim 14, and further comprising:

the heat exchanger casing, inlet end and outlet end are formed of titanium 21S or Nickel Inco 625.

17. The combined cycle power plant of claim 14, and further comprising:

the heat exchanger is connected to the gas turbine engine such that the exhaust gas from the engine flows around the heat exchange tubes and the compressed air from the compressor flows through the heat exchange tubes.

* * * * *